United States Patent
Ramsay

[11] Patent Number: 5,265,029
[45] Date of Patent: Nov. 23, 1993

[54] CHEMICAL CALCULATOR

[75] Inventor: O. Bertrand Ramsay, Ypsilanti, Mich.

[73] Assignee: Chemical Concepts Corporation, Ann Arbor, Mich.

[21] Appl. No.: 569,717

[22] Filed: Aug. 20, 1990

[51] Int. Cl.$^5$ .................. G06F 15/32; G06F 15/20
[52] U.S. Cl. ............... 364/496; 364/709.02; 364/709.15; 434/282; 434/298
[58] Field of Search .......... 364/496, 497, 705.01, 364/709.03, 709.01, 709.10, 709.11, 709.12, 709.13, 709.14, 709.15, 709.02; 340/706, 711; 434/281, 282, 298

[56] References Cited

U.S. PATENT DOCUMENTS

| | | | |
|---|---|---|---|
| 4,085,443 | 4/1978 | Dubois et al. | 364/900 |
| 4,151,596 | 4/1979 | Howells | 340/711 X |
| 4,205,391 | 5/1980 | Ulyanov et al. | 364/900 |
| 4,385,366 | 5/1983 | Housey, Jr. | 364/709.1 X |
| 4,510,583 | 4/1985 | Walz et al. | 364/709.12 X |
| 4,578,768 | 3/1986 | Racine | 364/560 |
| 4,689,753 | 8/1987 | Cameron | 364/496 |
| 4,747,059 | 5/1988 | Hirayama et al. | 364/496 |
| 4,916,740 | 4/1990 | Noda et al. | 364/709.1 X |
| 4,935,875 | 6/1990 | Shah et al. | 364/497 |
| 5,023,802 | 6/1991 | Fujita | 364/496 |
| 5,047,929 | 9/1991 | Fujita | 364/496 X |

FOREIGN PATENT DOCUMENTS 2748951 5/1979 Fed. Rep. of Germany .
WO9103787 3/1991 World Int. Prop. O. .

OTHER PUBLICATIONS

The HP-41C/41CV Alphanumeric Full Performance Programmable Calculator Owner's Handbook and Programming Guide, Apr. 1982 p. 257 HP-82153A Optical Wand.
MacMendeleev-A Program for Exploring the Periodic Table; Jul. 1989.
Periodic Plus TM -Software Database; Spectral Intelligence Corporation; Jul. 1989.

Primary Examiner—Thomas G. Black
Assistant Examiner—Michael Zanelli
Attorney, Agent, or Firm—Joseph C. MacKenzie; Owen D. Marjama; Frank Pincelli

[57] ABSTRACT

A chemical calculator providing rapid and convenient ways to retrieve information and perform calculations of chemical elements and chemical formulas obtained by direct entry from a periodic table keypad. Chemical element data, such as atomic number and mass, or calculated data (e.g. bond distance) of element pairs are displayed on an LCD or CRT screen when element keys are selected. Chemical formulas can be written when element, numerical or formulaic keys are pressed. The "Enter" command results in the display of the chemical formula's condensed formula, formula weight and percentage composition. Other function modes permit additional transformations, reaction yields and limiting reactants and empirical formula determinations.

18 Claims, 6 Drawing Sheets

CHEMICAL CALCULATOR

FIELD OF THE INVENTION

The present invention relates to computers for locating information about chemical elements and using that information to make calculations, derive formulae, and display same.

BACKGROUND OF THE INVENTION

The location of information about chemical elements and the use of that information for calculations or other purposes is a time-consuming as well as error prone process. Persons interested in working on complex chemical problems or calculations that are based on chemical element information are hindered by the time and convenience of locating the necessary information. Although there are available computer programs or calculators that assist in the retrieval and processing of this information, none are available in a convenient and portable form (such as found in a scientific calculator).

The following describes the types of problems that a chemical calculator could solve for the beginning chemistry student to a professional chemist, chemical engineer or other persons having a need to solve these kinds of chemical problems. The questions below are those that are typically found in chemistry textbooks or chemistry reference works. The steps required to answer these questions are followed by a brief notation as to the types of difficulties likely to be encountered or sources of error.

Question #1: What is the name, atomic number and mass, electron configuration and melting point of the element having the symbol "Al"?

Answer: Aluminum, at.no.=13, at.mass=26.9815, e.-configuration.=[Na]$3s^2 3p^1$, m.pt.=660° C.

Steps Involved in Answering This Question: Typically a person would check a periodic table or reference table (found in a reference handbook, separate attachment or wall chart). Any of these reference sources may not be readily available if the person is in a laboratory or plant, classroom or in the field. In addition, the reference source may not have all of the information, e.g. many condensed periodic tables may have only information about the first three. Even a large wall chart may not be readable to more than a few entries to a person at the back of a classroom.

Question #2: What is the difference in electronegativity and % ionic character in the bond between sodium and chlorine?

Answer: E.N. diff.=3.0−1.0=2.0, % ionic character=63%

Steps Involved in Answering This Question: Along with the problems of locating a source containing the electronegativity values (as described for Question #1 above), there is also the problem of knowing how to calculate the % ionic character.

Question #3: What is the constituent formula and formula weight of $Al_2(SO_4)_3 + 2.5\ H_2O$?

Answer: Formula=$Al_2S_3O_{14.5}$, F.W.=387.18575

Step 1: Write the formula
Step 2: Locate atomic mass of constituent elements
Step 3: Set up for calculations

| 3.1 | 2 | Al | = | 2 × 26.9813 | = 53.9626 | = 53.9626 |
|---|---|---|---|---|---|---|
| 3.2 | 1 | S | = | 1 × 32.064 | = 32.064 | |
| 3.3 | 4 | O | = | 4 × 15.9994 | = <u>63.9976</u> | |

-continued

| 3.4 | | | | 3 (SO$_4$) = 3 × 96.0616 | = <u>288.1848</u> |
|---|---|---|---|---|---|
| 3.5 | | | | | 343.1474 |
| 3.6 | 2 | H | = | 2 × 1.00797 | = 2.01594 |
| 3.7 | 1 | O | = | 1 × 15.9994 | = <u>15.9994</u> |
| 3.8 | | | | 2.5 (H$_2$O) = 2.5 × 18.01534 | = <u>45.03835</u> |
| 3.9 | | | | Formula Weight | = 387.18575 |

Sources of Errors and Difficulties: There are some dozen separate steps or operations that must be performed to answer the question. Examples of the major types of errors are:

Steps 1–3: Incorrect formula entry and set-up so that subscripts and/or coefficients multiply proper quantities. In steps 3.3 and 3.4, for example, the atomic mass of oxygen must be multiplied (step 2.3) by 4 before the sum within the parentheses is multiplied by 3 (step 3.4).

Step 2: Involves the location and transcription of the correct atomic weight of the element (beginning students often use the atomic number instead of the atomic mass).

Step 3: The use of computers or math calculators does speed up the actual calculation process, but a common source of error arises from typographical errors in number entry. (For example, this author obtained two slightly different answers to the question the two times they were tried due to minor typographical errors.)

Step 3.8: The student must recognize the significance and operation of the coefficient "2.5" that is multiplied times the formula weight of $H_2O$ and this added to the formula weight of the first part of the formula.

Question 4: What is the % (by weight) of the constituent elements found in the formula given in Question #3?

| Answer: | 13.937% Al | |
|---|---|---|
| | 24.843% S | 88.324% $Al_2(SO_4)_3$ |
| | 49.587% O | |
| plus | | |
| | 1.360% H | |
| | | 11.683% $H_2O$ |
| | 10.331% O | |

Description of Process for Solution: The first steps in the calculations are similar to that used for Question #3, except that it is necessary to separate the weights constituted by each element from the remainder of the formula:

In the First Part of the Formula:

| 4.01: | for Al, there are 2 Al = | |
|---|---|---|
| | 2 × 26.9626 = | 53.9626 |
| 4.02: | for S, there are 3 S (1 S in each SO$_4$) = | |
| | 3 × 32.064 = | 96.192 |
| 4.03: | for O, there are 12 O (4 O in each SO$_4$) = | |
| | 12 × 15.9994 = | 191.9928 |

In the Second Part of the Formula:

| 4.04: | for H, there are 5 H (2 H in H$_2$O) = | |
|---|---|---|
| | 2 × 2.5 × 1.00797 = | 5.26485 |
| 4.05: | for O, there are 2.5 O (1 O in H$_2$O) = | |
| | 2.5 × 15.9994 = | <u>39.9985</u> |
| | Formula Weight = | 387.4108 |

The % composition for each element is obtained by dividing the weights obtained in Steps 4.01–4.05 by the formula weight:

4.06: (53.9626/387.4108)×100=13.929% Al 4.07: $(96.192/387.4108) \times 100 = 24.829\%$ S 4.08: $(191.9928/387.4108) \times 100 = 49.558\%$ O 4.09: $(5.26485/387.4108) \times 100 = 1.359\%$ H 4.10: $(39.9985/387.4108) \times 100 = 10.324\%$ O Question #5: What is the a) (constituent) element formula and b) empirical formula corresponding to the following?

$$CH_3(CH_2)_3COCCl_2CO_2CH_2OH$$

Answer:
Constituent element formula: $C_8H_{12}O_4Cl_2$
Empirical formula: $C_4H_6O_2Cl$
Description of Process for Solution: To answer 5a), the procedure is relatively straight-forward, i.e. you simply count the number of atoms of each element:
$CH_3(CH_2)_3COCCl_2CO_2CH_2OH$

| Counting: | $CH_3$ | $(CH_2)_3$ | C | O | C | $Cl_2$ | C | $O_2$ | $CH_2$ | O | H | Total |
|---|---|---|---|---|---|---|---|---|---|---|---|---|
| for C: | 1 | 3 | 1 | — | 1 | — | 1 | — | 1 | — | — | 8 C |
| for H: | 3 | 6 | — | — | — | — | — | — | 2 | — | 1 | 12 H |
| for O: | — | — | — | 1 | — | — | — | 2 | — | 1 | — | 4 O |
| for Cl: | — | — | — | — | — | 2 | — | — | — | — | — | 2 Cl |

Formula = $C_8H_{12}O_4Cl_2$

Although this counting would appear to be rather straight-forward, the miscounting of only one element or summing error would produce a completely erroneous result.

To obtain an empirical formula, the constituent element formula obtained above must be examined to see if all of the subscripts are divisible by any number to produce the "simplest" empirical formula, i.e. that represent the formula that shows a ratio of the fewest atoms of the constituent elements that would be obtained by %-composition analysis (see Question #8 below). In this case, the subscripts are all divisible by 2 to give: $C_4H_6O_2Cl$.

Question #6: What is the formula weight, constituent formula and % composition of the reactant A and product B shown in the following transformation?

| Answer: | Reactant A<br>$C_6H_{12}O_2$ | Product B<br>$C_8H_{16}O_2$ |
|---|---|---|
| | FW = 116.1596 | FW = 144.2132 |
| | C = 62.091% | C = 66.629% |
| | H = 10.412% | H = 11.182% |
| | O = 27.547% | O = 22.189% |
| | 100.050% | 100.000% |

Solution to Question #6:
1. The constituent formula of reactant A is calculated following the procedures illustrated for the solution to Questions #4 and #5. The formula weight and % composition are then calculated using this formula as shown in the solution to Question #4.
2. Typically, the person trying to determine the constituent formula and/or formula weight of product B would recognize that formula B is related to formula A by the "loss" of $H_2O$ and "gain" of $CH_3C_2OH[C_2H_6O]$ in the transformation and would set up the calculation as follows:

| A = | $C_6H_{12}O_2$ | (Constituent Formula of A) |
|---|---|---|
| − | $H_2O$ | —"loss" of $H_2O$ |
| | $C_6H_{10}O$ | |
| + | $C_2H_6O$ | —"gain" of $C_2H_6O$ |
| B = | $C_8H_{16}O_2$ | (Constituent Formula of B) |

The formula weight of B can then be determined by either subtracting and adding (respectively) the formula weights of $H_2O$ (18.0152) and $C_2H_6O$ (46.0688) from the formula weight of A:

| A = | $C_6H_{12}O_2$ | = | 116.1596 |
|---|---|---|---|
| − | $H_2O$ | = | −18.0152 |
| | $C_6H_{10}O$ | = | 98.1444 |
| + | $C_2H_6O$ | = | +46.0688 |
| B = | $C_8H_{16}O_2$ | = | 144.2132 | or by using the formula of B to calculate its formula weight:

| 8 C | = | 8 × 12.011 | = | 96.088 |
|---|---|---|---|---|
| 16 H | = | 16 × 1.0079 | = | 16.1264 |
| 2 O | = | 2 × 15.9994 | = | 31.9988 |
| $C_8H_{16}O_2$ | | | = | 144.2132 |

While either of these procedures yield the same result, only the latter is useful in calculating the % composition:

$$C = \frac{96.088}{144.2132} \times 100 = 66.629\%$$

$$H = \frac{16.1264}{144.2132} \times 100 = 11.182\%$$

$$O = \frac{31.9988}{144.2132} \times 100 = 22.189\%$$

Suffice it to say, a number of steps must be taken and the choice of steps depends on the type of information or result desired. (The writer of this example spend in excess of 20 minutes setting up the mathematical operations to solve these questions. While the use of a calculator speeds up the process, it is not uncommon to still have a result that contains a mathematical error.)

Question #7: How many grams of product B (Question #6) would be obtained from 5.16 g of A?
Answer: 6.41 g of B
Solution to Question #7: Typically, the solution to this problem is obtained by determining the number of moles of A corresponding to 5.16 g.

$$5.16 \text{ g A} \times \frac{1 \text{ mole A}}{116.1596 \text{ g}} = 0.04442 \text{ moles A}$$

According to the transformation, 0.04442 moles of B should be formed, therefore:

$$0.04442 \text{ moles B} \times \frac{144.2132 \text{ g B}}{1 \text{ mole}} = 6.41 \text{ g or B}$$

As before, two separate mathematical operations must be performed in order to answer this question. Additional calculations would be required if the coefficients of the reactants and products in the chemical reaction shown in Question #6 were not all the same.

Question #8: What is the empirical formula of the substance whose composition is:
%C=28.22
%H=5.92
%O=28.19
%S=37.66

Answer: $C_4H_{10}O_3S_4$

Description of Process: The first step in answering this question involves dividing the % values for each element by the atomic weight of that element. This gives a formula in which the subscripts of the formula are proportional to the ratios of the atoms of the constituent elements in the compound:

8.01 for C=28.22/12.01115=2.34948

8.02 for H=5.92/1.00797=5.87319

8.03 for O=28.19/15.9994=1.76194

8.04 for S=37.66/32.064=1.17452

First-decision Empirical Formula:

$C_{2.34948}H_{5.87639}O_{1.76194}S_{1.117452}$

At this point, the goal is to reduce the formula to obtain whole number subscripts (i.e. you can not have "fractions" of atoms). While in come cases it might be possible to "round off" the numbers, typically this is not done at this point. Rather, the numbers are divided by the lowest value; in this case, 1.17452, for sulfur.

8.05 for C=2.34948/1.17452=2.00037

8.06 for H=5.87369/1.17452=5.00050

8.07 for O=1.76194/1.17452=1.50014

8.08 for S=1.17452/1.17452=1.00000

The new formula, rounding off to 2 decimal places is now:

$C_{2.00}H_{5.00}O_{1.50}S_{1.00}$

At this point, it seems obvious that to obtain simple whole-number ratios of atoms, the formula subscripts should be multiplied by 2 to give the empirical formula:

$C_4H_{10}O_2S_2$

Suffice it to say, this process involves several points of decision as to division or multiplication operations or rounding-off. The repetition of these decisions and mathematical operations account for significant introduction of transmission errors.

Question #9: What amount of product D is formed from 3.16 g of reactant C in the following chemical reaction?

$$C_6H_6 + 2CH_3Cl \rightarrow C_6H_4(CH_3)_2 + 2HCl$$
$$\phantom{C_6H_6 + 2CH_3Cl \rightarrow {}}C\phantom{_6H_6 + 2CH_3Cl \rightarrow {}}D$$

Answer: 3.32 g (0.0313 moles) of D

Description of Process: The first step involves determining the number of moles of reactant C:

$$\frac{3.16 \text{ g C}}{50.488 \text{ g C/mole C}} = 0.0626 \text{ moles C}$$

The formula weight of C must be determined as before. The second step involves setting up a ratio of moles C used to moles D produced according to the chemical equation:

$$\frac{2 \text{ moles C}}{1 \text{ mole D}} = \frac{0.0626 \text{ moles C}}{\text{moles D}}$$

$$\text{moles D} = \frac{0.0626}{2} = 0.0313$$

$$0.0313 \text{ moles D} \times \frac{106.157 \text{ g D}}{1 \text{ mole D}} = 3.32 \text{ g D}$$

Again, the set-up required to answer this question is time-consuming and error-prone. Typically, the answer will be in error by some ratio of the coefficients of the reactants and products involved in the calculation.

The Prior Art

Dubois et al, U.S. Pat. No. 4,085,443, disclose a computer having a keyboard for encoding and inputting thereto alphabetic and graphic data relating to chemical compounds.

Ulyanov et al, U.S. Pat. No. 4,205,391 disclose a computer having an encoding tablet serving purposes similar to those of Dubois et al.

Cameron, U.S. Pat. No. 4,689,753 discloses a calculator for stoichiometric conversions.

Hewlett Packard HP48SX Scientific calculator has a display of a blank periodic table format.

SUMMARY OF THE INVENTION

The present invention (a chemical calculator) provides a rapid and convenient means to retrieve and calculate from information about chemical elements and chemical formulas by direct entry from a periodic table keyboard. The invention comprises a portable keyboard or key pad containing approximately 100 "element" keys arranged in a periodic table format (along with other standard calculator/PC keys) connected to a computer and an LCD (or CRT) display screen. The type of information retrieved depends on the function/mode selected by pressing the appropriate one of keys labeled F2 through F10, which have been labeled with self-explanatory mnemonics, as indicated parenthetically in the following description of the modes of operation of the calculator of my invention. In the description to follow, it is to be supposed that the first key pressed will be a function or mode key. Thereafter, key pressings will be treated in the mode just established until an ENTER key is pressed in order to process data in accordance with that mode and evoke the appropriate display.

In Mode 1 ("ELEM",F2), when the user presses an element key, and then the ENTER key, the screen will display information about the element (e.g. the element name, atomic number and mass, electron configuration, melting/boiling point, etc.) drawn from the chemical element database. For example, the electron configuration for atomic fluorine would be displayed as $1s^2 2s^2 2p^6$.

In this mode, it is also possible to obtain the properties of groups or periods of chemical elements by pressing the Group/Period keys above or to the left of the vertical/horizontal rows, respectively, in the periodic table.

In Mode 2 ("PAIR",F)), on pressing any two of the element keys, the display will provide calculated information derived from the chemical element database; such as interatomic bond lengths, electronegativity difference, % ionic character, etc.

In Mode 3 ("FORM",F4), the user enters a chemical formula created by pressing 1) element keys, 2) subscript/coefficients, or 3) parentheses. Corrections or modifications of the displayed chemical formula can be done by moving through the formula with the cursor keys followed by element deletions and insertions. Then, pressing of the ENTER key displays;

A) the calculated formula weight corresponding to the chemical formula.
B) the % composition (of the constituent elements)
C) the chemical formula (of constituent elements).

For example, keying in Ca,3,(,P,O,4,),2,ENTER would evoke the display of $Ca_3(PO_4)_2$. Then ENTER again would display the formula weight as calculated by the computer.

In Mode 4 ("CALC",F5) chemical formulas generated under this mode can be mathematically manipulated. Example: If a person wanted to know what the new formula weight of compound B produced from A (whose formula weight had previously been determined) in the transformation:

A

B

Pressing the minus (−) key followed by keying in H,2,O; next pressing the addition (+) key, followed by keying in C,H,3,C,H,2,O,H; then pressing ENTER would display the condensed formula of B, $C_8H_{16}O_2$, along with its formula weight and percentage composition.

In Mode 5 ("RXN",F6) chemical reactants/products can be entered as formulas (as in Mode 3) and the chemical reaction can be balanced, and otherwise manipulated to determine yields, limiting reactants, etc. See Question #9, Background of the invention, supra.

In Mode 6 ("EMP",F7), the empirical formula of a compound can be determined by entering the element and its % composition or measurement. Pressing ENTER then produces the calculated subscripts for the chemical formula, which can then be manipulated by division/multiplication for the purpose of obtaining whole-number subscripts.

The molecular formula can be obtained of the compound if the molecular formula weight is known.

In Other Modes (F8–F10) specialized information or calculated information derived from the database can be set up using a customized database. For example:

In Mode 7 ("ISTP",F8), the properties (e.g. half-life, nuclear decay products, etc.) of an element's nucleides (isotopes) are obtained by pressing an element key.

In Mode 8 (M/E,F9), upon entering a chemical formula (as in Mode 3), the m/e peaks and relative intensity in a mass spectrum can be obtained.

In other modes, keying in standard chemical names would cause the corresponding formulae to be displayed. Conversely, keying in formulae would call up corresponding names.

The F1 key, labeled "HELP", is considered Mode O, and has the usual type of "HELP" function by which the user can call up "help" messages which might assist him in using the machine, as by explaining the modes, etc. Since Mode O does not require entry of data by the user, preferably pressing F1 above will evoke the "HELP" messages.

DETAILED DESCRIPTION OF THE INVENTION

Figure 1:
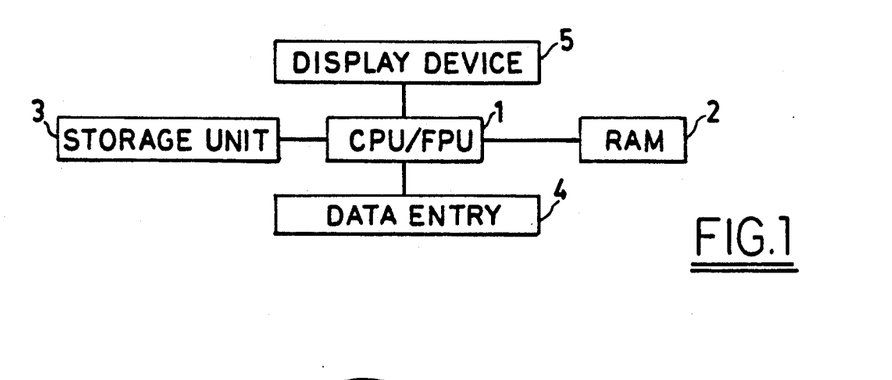
FIG. 1 is a box diagram of a chemical calculator in accordance with the invention.

In FIG. 1, the reference numeral 1 denotes a control processing unit (CPU) such as an Intel 8088, optionally fitted out for speed of computation, with a floating point unit (FPU), such as an Intel 8087.

A random access memory 2 (RAM) provides for program execution using data from a storage unit 3, a diskette drive, say.

A data entry device 4, such as a keyboard, is also provided. The data entry device could equally well be a bar code reading system, or other device actuable to cause the CPU to perform its several functions with respect to RAM 2, storage unit 3, and a display device 5, which may be a CRT, LCD screen, or the like. Not shown, but optionally provided, could be a printer and/or interconnection with other computers and/or networks.

Figure 2:
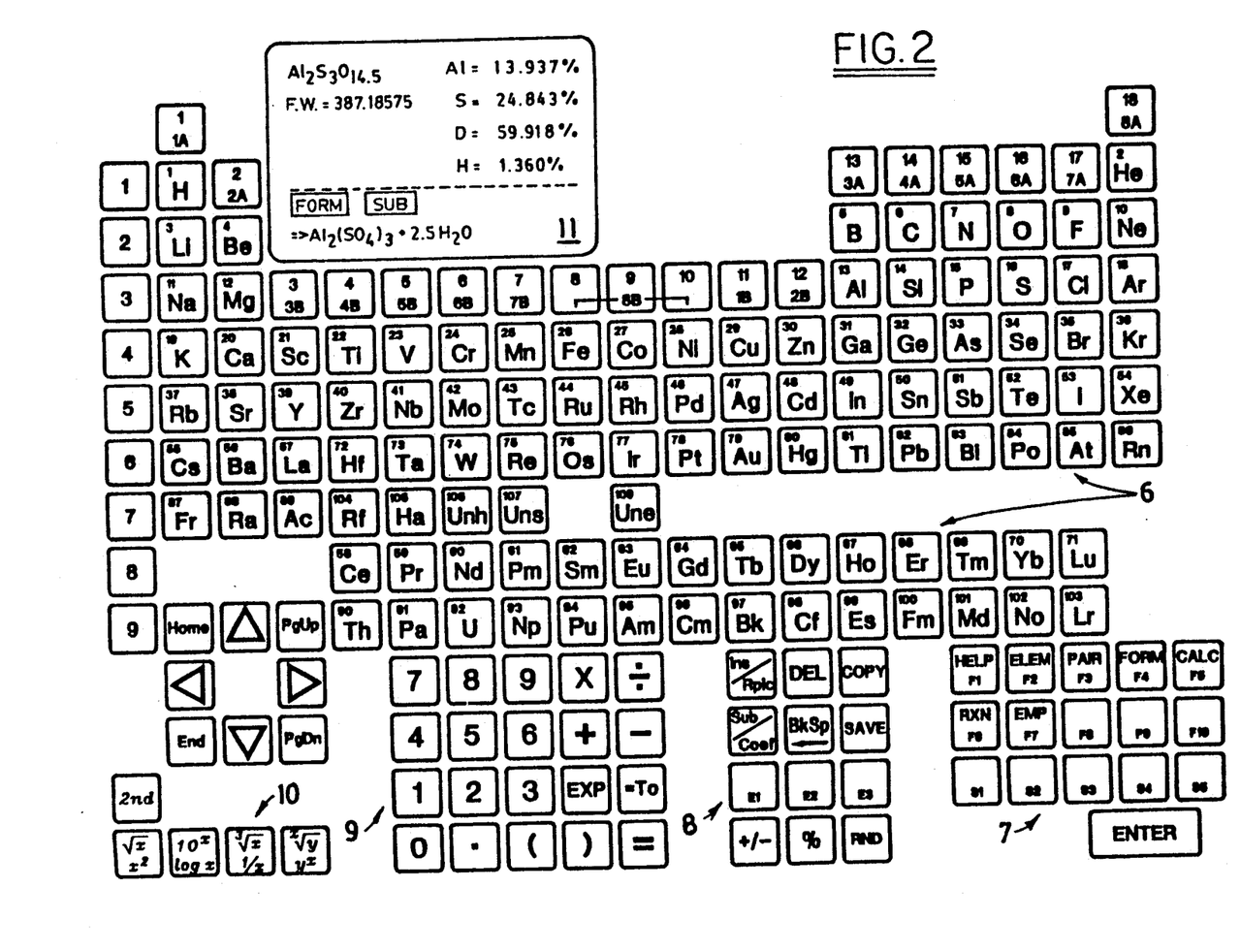
FIG. 2 is a plan view of one form that a chemical calculator in accordance with the invention may take in practice.

In actual practice, the chemical calculator, according to FIG. 1, may be housed in a simple housing (not shown) although FIG. 2 can be supposed to represent a plan view, to scale, of such housing, say roughly 6"×8"×2"−3".

As FIG. 2 shows, the calculator keyboard for the most part will be made up of an array or field 6 of element keys corresponding in number to the elements to be represented thereby, in this case 108, which are arranged in a periodic table of elements configuration, and each key is labeled with the atomic number and conventional alphabetic symbol of one of the elements. In this case, the configuration is one wherein the rare earth element keys are grouped just below the main body of elements.

In the lower right of the Figure, function keys F1 through F10, and so labeled, along with suitable mnemonics corresponding to the previously described "modes", an ENTER key, and five keys numbered S1, S2, S3, S4 and S5, provide a mode or function key pad 7. Also, keys S1, S2, S3, S4, and S5, are provided for special functions, and keys F8, F9, and F10, which have no mnemonics, can provide for customized function modes utilizing special database and calculation functions. For example, it is presently contemplated that keys F8 and F9 will provide isotope and m/e Modes 7 and 8, respectively, as described under Summary of the Invention, supra.

Just to the left of the key pad 7, an array of 12 keys provides an edit key pad 8. Nine of the keys have mnemonic labels indicating conventional editing functions, but three are labeled only E1, E2, and E3. These three provide for additional editing capabilities related to future use needs.

To the left of key pad 8 an array of 20 keys provides the functions of a conventional numerical key pad 9, such as is found on most terminal and personal computer keyboards.

At the lower left, is a shift key labeled 2nd, and below it are four keys each mnemonically labeled with pairs of mathematical functions of scientific interest, and providing a scientific function key pad 10. The shift key provides for selecting the upper or lower functions, as need be.

Just above the mathematical function key pad 9 are cursor screen control keys mnemonically labeled to indicate Home, direction, and the like, again all as commonly found on terminal and personal computer keyboards.

At the left of element key array 6, a column of keys, downwardly labeled 1 through 9, provides for selecting group properties of element periods (rows of elements).

Finally, the topmost keys in the columns of element keys are numbered 1 through 18 and provide for selecting properties of groups or "families" of elements. Thus, starting at the left of the array 6, keys 1 and 2 are also labeled 1A and 2A; 3 through 7 are labeled 3B through 7B; 8, 9, and 10 have the common label 8B; 11 and 12 are 1B and 12B; and 13 through 18 are 3A through 7A.

In addition, it is evident from FIG. 2 that in general there is room for addition of some keys. For example, in element field 6, there is a space between the Uns and Une elements 107 and 109, for an element 108, and to the right of the Une key there is room for up to nine more keys corresponding to elements 110 and up, which so far are undiscovered, or at least not acknowledged.

Figure 3:
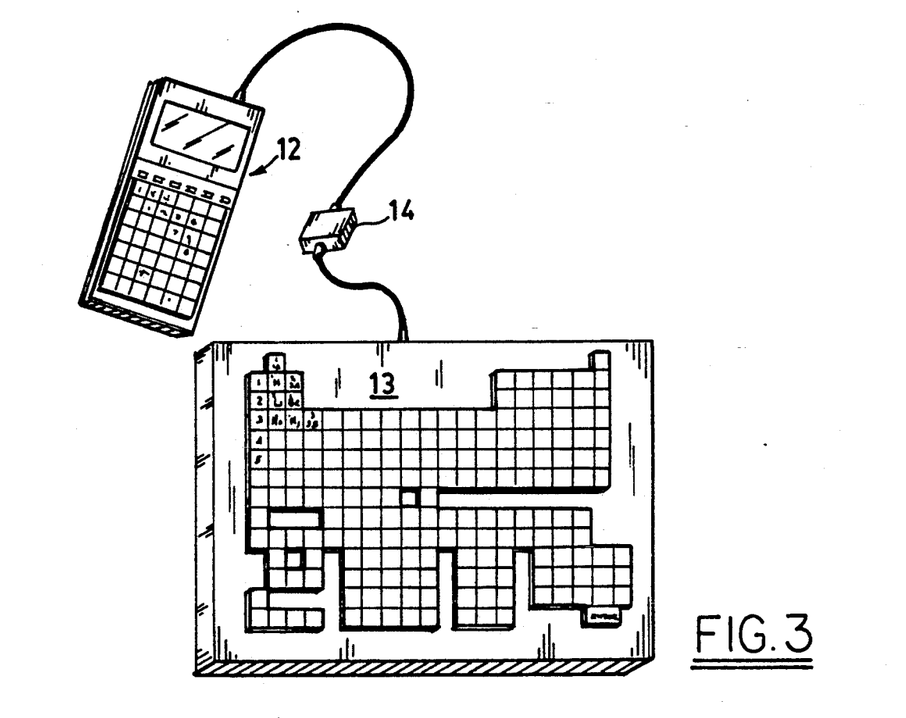
FIG. 3 illustrates an alternative to the FIG. 2 form of the invention.

The calculator, according to the invention, can also take the form shown in FIG. 3 wherein instead of being a unitary assemblage, it utilizes presently available calculator hardware, and the data entry features of the FIG. 2 calculator.

Thus, in FIG. 3, a calculator 12, such as the previously-referred to Hewlett Packard HP48SX, and a data entry device 13 corresponding to data entry device 4 of FIG. 1, and having the format shown in FIG. 2, but lacking display 11, are connected via a suitable interface 14. It should be noted that calculators like the HP48SX are ordinarily equipped with a means for connecting them to external data entry devices, such as bar code readers, etc., and are built around microprocessors programmable by means of "cards" inserted in the interior of the calculator. In other words, the HP48SX differs from the present invention only in respect of data entry arrangement. The HP48SX has a display which would serve for display 11.

Figure 4:
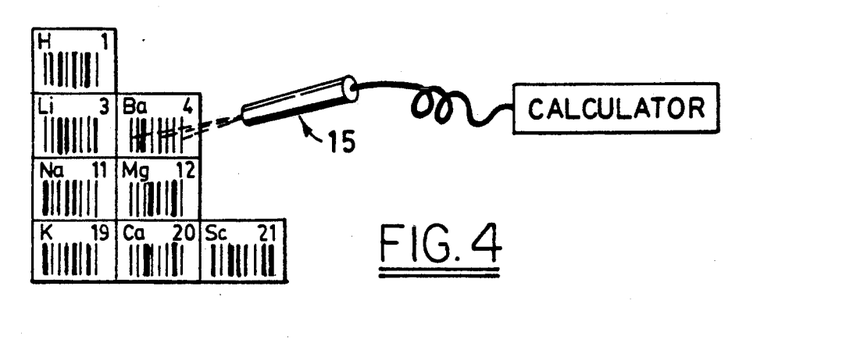
FIG. 4 illustrates an alternate form of data entry device for use in the chemical calculator in accordance with the invention.

An alternative to pressing the element symbol on a key pad or board would be to provide a bar code reader. Thus, as shown in FIG. 4, the reader 15 is pointed at the element symbol square for beryllium. The square contains the bar code for "Be", and the reader is aimed at the bar code for reading it into the calculator. Another alternative (not shown) would be a screen display configured by software as the periodic table in the format shown in FIG. 3, and which would be accessed by light pen, "mouse", or equivalent.

While the data entry device 4 has thus far been described as a specialized device, the calculator will be like conventional personal computer systems in having software to control the operation of the calculator. When the calculator is turned on a copy of the software is loaded into memory and from then on the CPU uses those instructions and the user input to decide what action to take.

The software used in the calculator can be divided in three separate layers: BIOS, DOS and Application.

BIOS contains the basic instructions used by the CPU to display data on the screen, to access the Storage Unit and to receive the user input from the keyboard. They are included with the CPU/Memory modules. This is conventional and no further description is necessary.

DOS is the so called Operating System. It takes control of the CPU and does the necessary tasks to load the Application software. In a regular computer it is also used to do other tasks such as creating, modifying and deleting files. In the calculator its tasks will be much more limited. It is conventional, and the user will never interact with DOS during normal operation of the calculator, so no further description is necessary.

Application is the actual program in charge of providing the unique functions available in the calculator. It is divided into several modules as shown in the box diagram of FIG. 5, wherein the labels in the boxes, Parser, Screen Driver, Database Manager, and Keyboard Driver, briefly describe the functions of and denote the modules.

Figure 6:
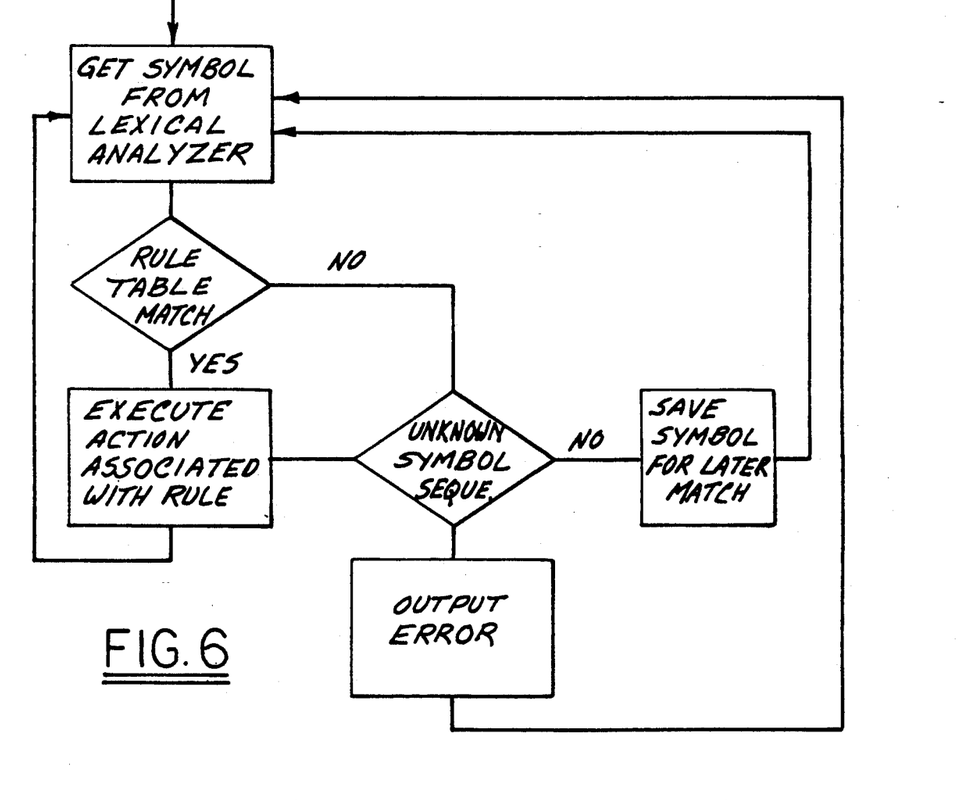
FIGS. 6, 7 and 8, respectively, illustrate lexical analysis, a symbol chart, and parsing.

Parser is the heart of the software. It contains the rules defining the Chemical Functions to be provided by the calculator, and calls for the Lexical Analyzer to retrieve the user input, i.e., chemical element symbols, mathematical symbols, etc. When it needs a datum about a specific chemical element it calls the Database Manager. Once it has determined the result of a Chemical Function it calls the screen driver to display the data. FIG. 6 illustrates the parsing operation.

Figure 5:
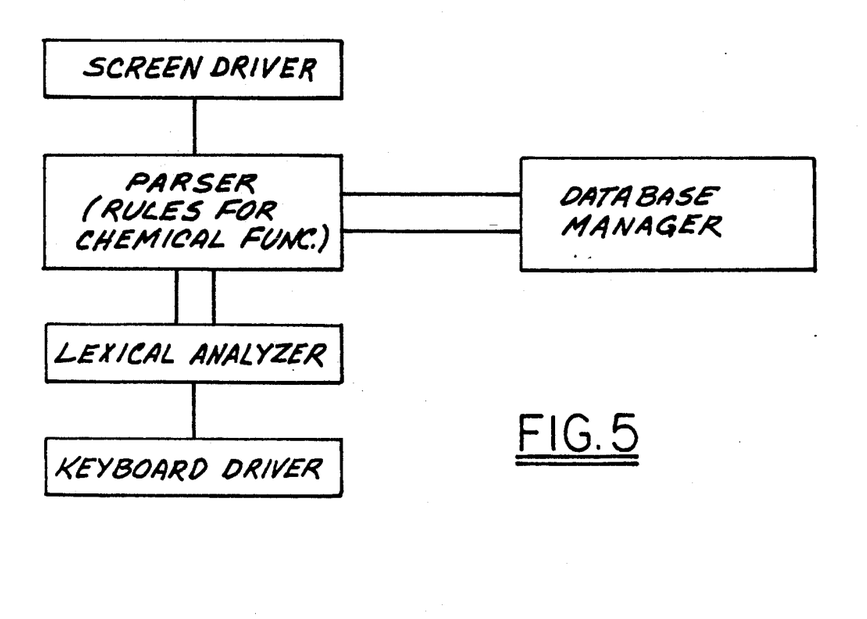
FIG. 5 is a box diagram of the application software according to the invention.

Screen Driver's main function is to cause the display 11 to display the results of calculations as defined by the Parser. It will also echo back the user input, i.e., if the user presses the symbol for helium, the screen driver will display "He" on the screen.

Database Manager contains all the data related to the chemical elements. It accepts requests from the Parser about a specific element and returns the necessary information to the Parser.

Figure 7:
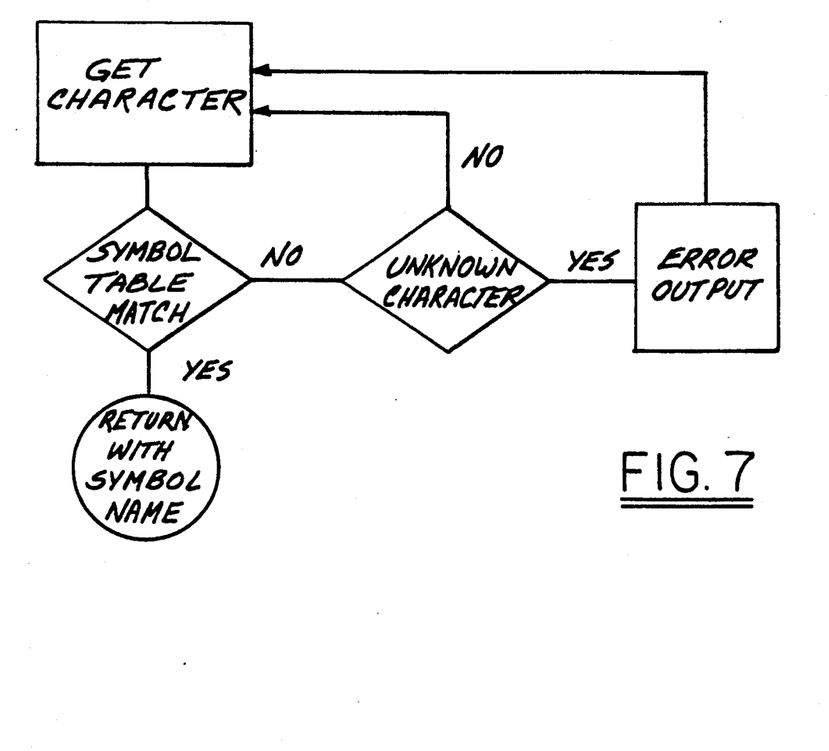
Figure 8:
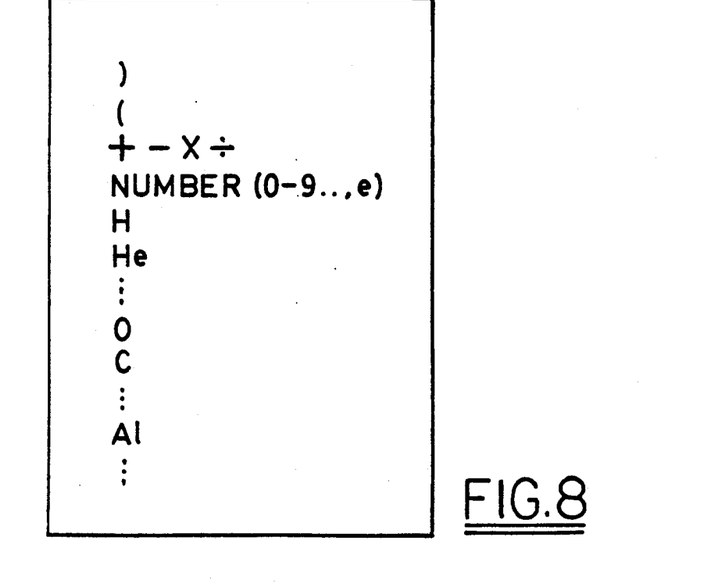

Lexical Analyzer serves as a filter/translator to the Parser. When the Parser requests some input, it must call the Lexical Analyzer. The Lexical Analyzer then calls the Keyboard Driver and, as shown in FIG. 7, translates the user input into the appropriate chemical element and other symbols as shown in FIG. 8.

Keyboard Driver's function is to accept the user input (key presses) and pass the characters to the Lexical Analyzer for translation.

Figure 9:
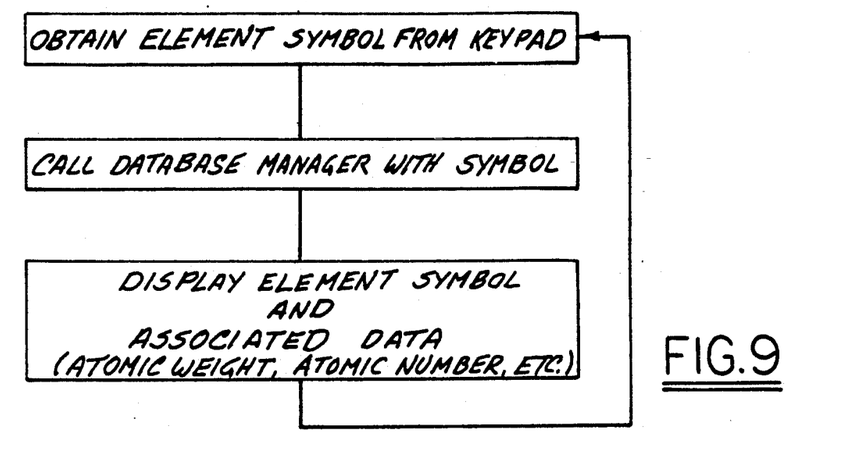
FIGS. 9, 10 and 11 are flow charts for several modes of operation of the chemical calculator according to the invention.

FIG. 9 illustrates Mode 1, i.e., one presses the key marked F2, "Elem", and then a single key in the field 6, causing the display of the element symbol marked on the former key, along with a listing of data associated with that element: atomic weight, atomic number, and/or other data such as may be obtained from a periodic table chart such as that shown on the inside back cover of the well-known and ubiquitous *CRC Handbook of Chemistry and Physics,* 49th Edition 1968-1969 (hereinafter CRC Handbook).

More particularly, the database fields in the current calculator include, for each element of the periodic table, the following data:
1. Symbol
2. Name
3. Atomic number
4. Atomic mass
5. Electron configuration
6. Crystal structure
7. Property of oxide of element
8. Physical state of element
9. Covalent radius
10. Atomic radius (ionic radius)
11. Atomic volume
12. Ionization potential
13. Specific heat
14. Thermal conductivity
15. Heat of fusion
16. Heat of vaporization
17. Electronegativity
18. Electron affinity
19. Electrical conductivity There is superficial resemblance here to merely getting the same material by inspection from the CRC Handbook and/or other such sources. However, in the present invention, the keyboard is laid out and marked with element symbols and atomic numbers like the CRC Handbook table, but the latter's confusing jumbles of other data have been eliminated, thereby allowing one not only to easily locate the desired element symbol without the distracting graphics accompanying those symbols in the CRC Handbook table, but to retrieve, without human error, the data represented by those graphics, since once the correct element is chosen, nothing is left to the vagaries of human visual inspection and selection of data.

Figure 10:
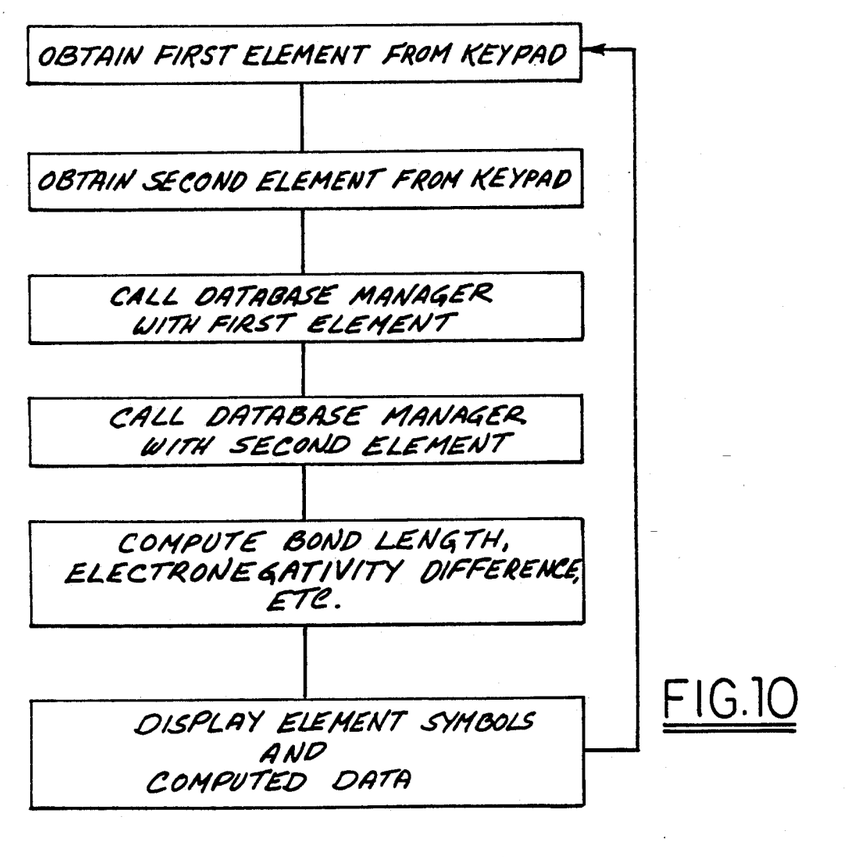

In Mode 2, the user presses the key marked F3 "PAIR", and then two element keys. As shown in FIG. 10, the element symbols are displayed, as in the Mode 1 case, but this time a calculation is made, about some relation between the two elements, such as bond length or electronegativity difference.

Turning to Mode 3, the display 11 (an LCD screen, say) indicates that a user of the calculator has used it in Mode 3, i.e., has pressed the key marked F4, "FORM", in FIG. 2, and then keyed in the appropriate alphabetic, numeric and syntactical symbols in the arrangement known as "aluminum sulphate", the conventional formula for which is displayed at the bottom of display 11.

Figure 11:
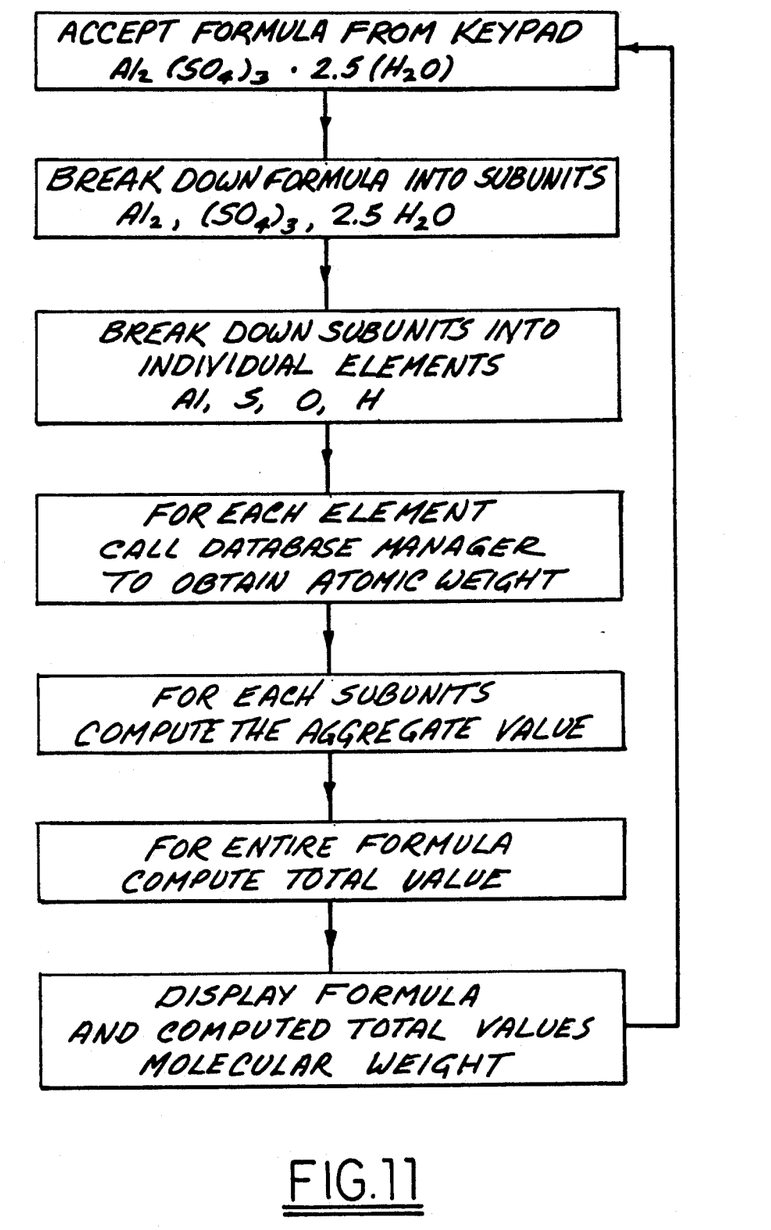

The software causes the CPU to analyze the conventional formula into its parts. Thus, as shown in FIG. 11, the software causes the CPU to break the formula, as keyed in, down to its individual elements, Al, S, O and H. The CPU also gets the numerical values of the atomic weights of Al, S, O and H from the database manager. Pressing F4, "FORM", invokes the parser's algorithmic capacity for summing up the atomic weight total for 2Al, 3S, 12O, 5H, 2.50 O, to wit, 387.17615. In effect, the parser takes the multipliers from the lexical analyzer, gets the individual atomic weights from the database manager and performs the summation of $2Al + 3S + 14.5O + 5H =$ Formula Weight.

The foregoing procedure is superficially analogous to using the above CRC Handbook. But, at page B-173 thereof, where the physical constants of some aluminum compounds are tabulated, only the unhydrated sulphate, and a natural occurring hydrate with 18 $H_2O$ are listed. Moreover, even if the 2.5 $H_2O$ hydrate were listed, the formula weight would be given by CRC to only two decimal places, whereas in the present invention, the weight is given by the calculator according to the invention automatically and error-free, to five decimal places.

The foregoing explanations of Modes 1, 2 and 3 in terms of FIGS. 9, 10 and 11 obviate such explanation of the other Modes 4 et al in view of the calculation examples set forth above under Background of the Invention, and of the descriptions of said other modes set forth under Summary of the Invention, supra.

N.B. In claims the term "chemical calculations" means deriving formulae, balancing chemical reactions, and/or the like. In other words, the sort of calculations set forth in detail hereinabove.

Having described my invention in accordance with the statutes, what is claimed is:

1. A computer comprising, in combination, central processing unit (CPU) means, data entry means, and display means:

said data entry means having first selector means actuable for selecting a first processing mode wherein information relating to any chemical element can be processed by said CPU means, there being a second processing mode for performing calculation using said information; said information being characteristic of said element and further including results of said calculation;

said data entry means having second selector means actuable for selecting any chemical element;

said CPU means having data base manager means containing said information relating to and characteristic of any chemical element selected by said second selector means; and said CPU mean being responsive to selection of a said processing mode by said first selector means, and to selection of a specific chemical element by said second selector means, such as to cause at least part of said information to be displayed by said display means;

said second selector means having an array of pads, each of said pads having a different chemical element symbol thereon, and the array being in the format of the periodic table of chemical elements;

said second selector means also having manually actuable means, said manually actuable means being associated with said pads and also being manually actuable for selecting a specific chemical element.

2. The computer of claim 1 wherein said first selector means is actuable for selecting said second processing mode, and said second selector means being actuable for selecting a plurality of chemical elements;

said database manager means containing calculated information derived by calculation from information relating to and characteristic of the chemical elements of said plurality of chemical elements;

said CPU means being responsive to selection of said second processing mode by said first selector means and to selection of said plurality of chemical elements by said second selector means, wherein said display means displays said calculated information.

3. The computer of claim 1, wherein said manually actuable means is actuated by fingering said pads.

4. The computer claim 1, wherein said manually-actuable means is aimable at a plurality of said symbols and is actuable to read said symbols for input to said CPU means for displaying said calculated information on said display means.

5. The computer of claim 1 wherein said first selector means is actuable for selecting a third processing mode, and said second selector means being actuable for selecting a plurality of chemical elements;

said second selector means also being actuable for selecting formulaic elements for defining a specific chemical consisting essentially of said plurality of chemical elements;

said CPU means being responsive to selection of said third processing mode by said first selector means and to selection of said plurality of chemical elements and of said formulaic elements by said second selector means, wherein said display means displays the formula for said chemical and information relating thereto.

6. The computer of claim 5, wherein said second selector means is also manually actuable for causing said second selector means to select said formulaic elements.

7. The computer of claim 6, wherein said manually actuable means is actuated by fingering said pads.

8. The computer of claim 6, wherein said manually-actuable means is aimable at a plurality of said symbols and is actuable to read said symbols for input to said CPU means for displaying said formula and said information relating thereto on said display means.

9. A chemical calculator comprising computer means and program means, said computer means comprising central processing unit means (CPU), a display means, and data entry means, said program means comprising database manager means and control means for controlling said CPU to display information on said display means which relates both the data entered by said data entry means, and the data provided by said database manager means, said data entry means having the format of the periodic table of elements for allowing entry of symbols identifying said elements, said data provided by said database manager means including data relating to said elements, and said program means being responsive to said data entry means for controlling said database manager means to provide, for said displaying means, element-related data corresponding to any element or elements whose symbol or symbols have been entered by said data entry means;

said program means providing for using said data in performing data processing functions including making calculations, deriving formulae, and balancing chemical reactions.

10. A computer comprising, in combination, central processing unit (CPU) means, data entry means and display means:

said data entry means having first selector means actuable for selecting a first processing mode wherein information relating to any chemical element can be processed by said CPU means, said information being characteristic of said element;

said data entry means having second selector means actuable for selecting any chemical element;

said CPU means having data base manager means containing said information relating to and characteristic of any chemical element selected by said second selector means;

said CPU means being responsive to selection of said processing mode by said first selector means, and to selection of a specific chemical element by said second selector means, wherein information relating to said specific chemical element is displayed by said display means;

said second selector means having an array of pads, each of said pads having a different chemical element symbol thereon, and the array being in the format of the periodic table of chemical elements;

said second selector mean also having manually actuable means, said manually actuable means being associated with said pads and also being manually actuable for selecting a specific chemical element.

11. The computer of claim 10, wherein said manually-actuable means is actuated by fingering said pads.

12. The computer of claim 10, wherein said manually-actuable means is aimable at a given symbol and is actuable to read said given symbol for input to said CPU means for displaying said information relating to and characteristic of the chemical element. represented by said symbol on said display means.

13. A computer comprising, in combination, central processing unit (CPU) means, data entry means and display means:

said data entry means having first selector means actuable for selecting a first processing mode wherein information relating to any chemical element can be processed by said CPU means, said information being characteristic of said element;

said data entry means having second selector means actuable for selecting any chemical element;

said CPU means having data base manager means containing said information relating to and characteristic of any chemical element selected by said second selector means;

said CPU means being responsive to selection of said processing mode by said first selector means, and to selection of a specific chemical element by said second selector means, wherein information relating to said specific chemical element is displayed by said display means;

said first selector means being actuable for selecting a fourth processing mode, and said second selector means being actuable for selecting a plurality of chemical elements in a given composition;

said second selector means also being actuable for selecting the percent composition for each of said elements in said given composition;

said CPU means being responsive to selection of said fourth processing mode by said first selector means and to selection of said plurality of chemical elements and of said percent composition for each of said elements by said second selector means, wherein said display means displays the empirical formula corresponding to said plurality of chemical elements and said percent composition for each thereof;

said selector means having an array of pads, each thereof having a different chemical element symbol thereon, and the array being in the format of the periodic table of chemical elements;

said selector means also having manually actuable means, said manually actuable means being associated with said pads and also being manually actuable for causing said selector means to select said plurality of chemical elements and said percent composition thereof.

14. The computer of claim 13, wherein said manually-actuable means is aimable at a plurality of said symbols and is actuable to read said symbols for input to said CPU means for displaying said empirical formula on said display means.

15. The computer of claim 13, wherein said manually actuable means is actuated by fingering said pads.

16. In a computer comprising, in combination, central processing unit (CPU) means, data entry means including selector means, display means, and database manager means containing information relating to and characteristic of any chemical element, and said selector means selecting certain of said information to be displayed on said display means, the improvement wherein said selector means has an array of chemical element information selecting means, each selecting means of said array having a humanly-readable representation of a single chemical element, and there being substantially as many selecting means in said array as there are chemical elements in the periodic table of elements;

said data entry mean also providing for selecting a chemical calculation in which to use chemical element information selected by selecting means of said array;

said database manager means containing the aforesaid information, and being effectively responsive to selection thereof for providing same to said CPU means for calculation thereby, and for display of calculation results by said display means.

17. The invention of claim 16, including the further improvement wherein each of said selecting means is a manually-actuable keypad means.

18. The invention of claim 16, including the further improvement wherein each of said selecting means is a keypad means, and said array has the format of the periodical table of elements.

* * * * *